(12) United States Patent
Tsue et al.

(10) Patent No.: US 7,446,898 B2
(45) Date of Patent: Nov. 4, 2008

(54) METHOD, SYSTEM AND PROGRAM FOR PROCESSING PRINTING ORDERS

(75) Inventors: Takashi Tsue, Kaisei-machi (JP); Akira Yoda, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 851 days.

(21) Appl. No.: 10/336,845

(22) Filed: Jan. 6, 2003

(65) Prior Publication Data

US 2003/0147096 A1 Aug. 7, 2003

(30) Foreign Application Priority Data

Jan. 7, 2002 (JP) .............................. 2002-000570

(51) Int. Cl.
*G06F 15/00* (2006.01)
*G06F 15/16* (2006.01)

(52) U.S. Cl. ........................................ 358/1.6; 709/203

(58) Field of Classification Search ................. 358/404, 358/407, 468, 1.6, 1.15, 1.18, 1.16, 501; 709/203; 715/738, 740
See application file for complete search history.

(56) References Cited

U.S. PATENT DOCUMENTS

| | | | |
|---|---|---|---|
| 5,237,428 A | 8/1993 | Tajitsu et al. | |
| 5,974,401 A | 10/1999 | Enomoto et al. | |
| 6,522,418 B2 * | 2/2003 | Yokomizo et al. | 358/1.15 |
| 6,654,135 B2 * | 11/2003 | Mitani | 358/1.15 |
| 6,738,494 B1 * | 5/2004 | Savakis et al. | 382/100 |
| 6,778,684 B1 * | 8/2004 | Bollman | 382/112 |
| 6,925,498 B2 * | 8/2005 | Kujirai | 709/225 |
| 6,934,048 B2 * | 8/2005 | Igarashi et al. | 358/1.15 |
| 6,947,169 B2 * | 9/2005 | Nitta | 358/1.2 |
| 7,020,697 B1 * | 3/2006 | Goodman et al. | 709/223 |
| 2001/0036366 A1 | 11/2001 | Cook et al. | |
| 2002/0003896 A1 | 1/2002 | Yamazaki | |
| 2002/0015179 A1 * | 2/2002 | Igarashi et al. | 358/1.15 |

FOREIGN PATENT DOCUMENTS

| | | |
|---|---|---|
| EP | 1 087 607 A2 | 3/2001 |
| EP | 1 139 648 A2 | 10/2001 |
| EP | 1 154 631 A2 | 11/2001 |
| JP | 2001-326847 A | 11/2001 |
| WO | WO 01/31907 A1 | 5/2001 |

* cited by examiner

*Primary Examiner*—Jerome Grant, II
(74) *Attorney, Agent, or Firm*—Sughrue Mion, PLLC

(57) ABSTRACT

Printing processing is carried out efficiently when a print order regarding image data is placed through a network. Order information C and thumbnail image data sets TS of image data sets S to be printed are sent from a user terminal 11 to an order reception server 21 in a DPE store 2. A controller 23 judges whether or not a communication line of a network 3 and/or a digital mini-laboratory 22 are heavily loaded, and sends a reception permit Q to the user terminal 11 if a result of the judgment is negative. The user terminal 11 receives the reception permit Q and accesses the order reception server 21 to send the image data sets S thereto. The digital mini-laboratory 22 carries out printing processing on the image data sets S to generate prints P.

65 Claims, 4 Drawing Sheets

METHOD, SYSTEM AND PROGRAM FOR PROCESSING PRINTING ORDERS

BACKGROUND OF THE INVENTION

1. Field of the Invention

The present invention relates to a printing order processing method and a printing order processing system for processing printing orders regarding image data received via a network. The present invention also relates to a program embodied on a computer-readable recording medium that causes a computer to execute the printing order processing method.

2. Description of the Related Art

There are known digital photograph service systems for carrying out various types of digital photograph services such as storing photographs obtained by users in image servers after digitization thereof, recording the photographs in CD-Rs to be provided to the users, printing images photographed by users with digital cameras, and receiving orders for additional prints. As one form of such digital photograph service systems, a printing service system for receiving printing orders via a network such as the Internet has also been proposed.

In such a printing service system, a user installs viewer software in his/her personal computer that acts as a user terminal, for reproducing image data recorded in a recording medium such as a CD-R or obtained by a digital camera. The user reproduces images represented by the image data, and generates order information describing the content of an order by using an ordering function built-in to the viewer software if the user wishes to place an order. The user transfers the order information and the image data representing the images to be printed to an order reception server installed in a service center for receiving the order from the user terminal via the network such as the Internet. The order reception server transfers the order information and the image data to a print server installed in a large-scale laboratory for processing the order. Printed matter such as additional prints, picture postcards, or a photograph album is then generated in the laboratory, based on the order information.

The printed matter generated in the above manner is delivered or mailed to an agency specified by the user at the time of placing the order. The user visits the agency and can receive the printed matter by paying a charge at the agency. The user can designate the agency at the time of placing the order, and a desired store or the like close to the place of residence or employment of the user is generally designated as the agency. The image data and the order information are transferred from the order reception server to the laboratory in collaboration with the agency designated by the user.

The order information herein referred to is information such as a processing number for specifying the content of a printing service (generation of ordinary prints or picture postcards or the like), an image number for specifying a photograph (a number representing an image data file), a print size, a quantity of prints, specification of printing paper (such as glossy or non-glossy), thickness of the printing paper, the content of image processing, and trimming specification, for example. The order information further includes information regarding the name, the address, the zip code and the phone number of the user, for example.

The printed matter generated in the printing service is delivered or mailed to the agency designated by the user at the time of placing the order, and the user receives the printed matter at the agency, as has been described above. If the agency installs a server for receiving the order information and the image data as well as a printer to print the image data, the agency can function as a laboratory. If the agency has the function of a laboratory, delivery of the printed matter to the agency becomes unnecessary. Therefore, although the agency is small as a laboratory, the time necessary for providing the user with the printed matter can be shortened.

In the printing service system described above, the user can place the printing order regarding the image data by using his/her personal computer at any time of his/her convenience, regardless of whether it is in the daytime or at night. However, the printing order is placed regardless of how busy the laboratory or the agency (hereinafter referred to as the printing service provider) is. Therefore, in the printing service provider, a large amount of printing orders may concentrate in a specific time period, or almost no printing order may be placed in another time period. For this reason, it is difficult for the printing service provider to accurately estimate when the printing order of the user is processed completely, and the printing service provider conventionally notifies the user of a rough deadline such as in 3 working days, for example. Furthermore, in the case where a large amount of printing orders are concentrated, a communication line of the network becomes congested. Therefore, the time necessary for the user terminal to transfer the image data and the order information to the order reception server in the printing service provider becomes longer. Moreover, in the case where a large amount of printing orders are concentrated, a printing processing apparatus installed in the printing service provider is in full operation. On the other hand, in the time period when almost no order is placed and thus printing processing is hardly carried out, the printing processing apparatus is almost idle. In this manner, the printing processing apparatus is not used efficiently. Since the printing service provider needs to install a system in consideration of the case where a large amount of printing orders concentrate, a large-capacity server becomes necessary for processing such orders. Consequently, the system becomes larger and the cost therefor increases.

SUMMARY OF THE INVENTION

The present invention has been conceived based on consideration of the above circumstances. An object of the present invention is therefore to efficiently carry out printing order processing at a printing service provider.

A first printing order processing method of the present invention is a method of carrying out printing processing on image data with use of printing processing means according to order information representing the content of a printing order regarding the image data, by using an order reception server for receiving the image data and the order information that are stored in a predetermined storage location and transferred via a network. The printing order processing method comprises the step of:

receiving the image data from the predetermined storage location by using the order reception server only in the case where reception of the image data is permitted.

A second printing order processing method of the present invention is a method of carrying out printing processing on image data with use of printing processing means according to order information representing the content of a printing order regarding the image data, by using an order reception server for receiving the image data and the order information that are stored in a predetermined storage location and transferred via a network. The printing order processing method comprises the steps of:

judging whether or not reception of the image data is permitted, based on a state of the printing processing means; and receiving the image data from the predetermined storage location by using the order reception server only in the case where reception of the image data is permitted.

The "predetermined storage location" refers to any location wherein the image data are stored. For example, the predetermined storage location can be an order terminal that requests printing, or a storage server that stores image data and is connected to the order terminal via a network.

Reception of the image data may be permitted by an access of the order reception server to the predetermined storage location or by sending a reception permit regarding the image data from the order reception server to the predetermined storage location. In the former case, the order reception server receives the image data by downloading the image data after accessing the predetermined storage location. In the latter case, the order reception server sends the reception permit to the predetermined storage location, and the predetermined storage location sends the image data to the order reception server after accessing the order reception server based on the reception permit.

The "state of printing processing means" refers to printing performance of the printing processing means, how busy the printing processing means is, and how busy the network to send the image data to the printing processing means is.

The state of the printing processing means can be judged by how long a printing queue is, the time necessary for image processing, the number of operators carrying out the printing processing, and skill of the operators. How long the printing queue is can be judged by counting the number of sets of image data in the printing queue. The time necessary for image processing can be calculated by the size of image data. The skill of the operators can be judged by how the operators work and how long the operators have been engaged in the printing processing. The state of the network can be judged by sending a small-size data to a user terminal and by measuring the time to receive a reply from the user terminal notifying reception of the small-volume data.

The order information may be received together with the image data. Alternatively, the order reception server may receive only the order information before receiving the image data.

In the first and second printing order processing methods of the present invention, thumbnail image data representing a thumbnail image of an image represented by the image data may be received in advance by the order reception server. In this case, the thumbnail image data are checked and only the image data corresponding to the thumbnail image data that have passed the check are received.

The thumbnail image data are checked to judge whether or not the image data can be printed, regarding points such as whether the image data are not damaged or whether the image data are prohibited from being printed due to copyright.

In the first and second printing order processing methods of the present invention, the order reception server may receive the thumbnail image data in advance so that an image processing condition to be used in image processing on the image data can be calculated based on the thumbnail image data. The image processing is carried out on the image data according to the image processing condition at the time the printing processing is carried out.

In the first and second printing order processing methods of the present invention, the thumbnail image data may be received only in the case where reception of the thumbnail image data is permitted.

In the first and second printing order processing methods of the present invention, a reception notification may be sent to the predetermined storage location before and/or after the image data are received.

The "reception notification" refers to a notification of the fact that the image data are going to be received if issued before the image data are received by the order reception server, or the fact that the image data have been received if issued after reception of the image data has been completed. More specifically, the reception notification may be issued as display on a screen and/or an audio message.

In the first printing order processing method of the present invention, reception of the image data may be permitted during a predetermined communication time enabling communication with the predetermined storage location.

The communication time may be set in advance when a printing service is contracted with a user. Alternatively, a user may agree on the communication time with a printing service provider that carries out the printing processing whenever the user places a printing order to the printing service provider.

In the first printing order processing method of the present invention, how busy the network and/or the printing processing means are may be judged so that reception of the image data can be permitted based on a result of the judgment.

More specifically, a state of a communication line between the order terminal and the order reception server and/or a state of the printing processing means that is connected to the order reception server may be judged. In this case, reception of the image data is permitted when the communication line and/or the printing processing means are not heavily loaded. Alternatively, the reception may be permitted in a predetermined time period such as midnight, when the concentration of printing orders is low.

A first printing order processing system of the present invention comprises an order reception server for receiving image data and order information that are stored in a predetermined storage location and sent via a network, and printing processing means for carrying out printing processing on the image data according to the order information representing the content of a printing order regarding the image data. The first printing order processing system further comprises:

control means for controlling the order reception server so that the order reception server receives the image data from the predetermined storage location only in the case where reception of the image data is permitted.

A second printing order processing system of the present invention comprises an order reception server for receiving image data and order information that are stored in a predetermined storage location and sent via a network, and printing processing means for carrying out printing processing on the image data according to the order information representing the content of a printing order regarding the image data. The second printing order processing system further comprises:

judgment means for judging whether or not reception of the image data is permitted, based on a state of the printing processing means; and control means for controlling the order reception server so that the order reception server receives the image data from the predetermined storage location only in the case where reception of the image data is permitted.

In the first and second printing order processing systems of the present invention, the control means may control the order reception server so that the order reception server receives only the order information in advance.

In the first and second printing order processing systems of the present invention, the order reception server may receive thumbnail image data representing a thumbnail image of an image represented by the image data in advance. In this case, the control means checks the thumbnail image data, and controls the order reception server so that the order reception server receives only the image data corresponding to the thumbnail image data that have passed the check.

In the first and second printing order processing systems of the present invention, the order reception server may receive the thumbnail image data in advance and may further comprise:

image processing means for calculating, based on the thumbnail image data, an image processing condition used in image processing to be carried out on the image data and for carrying out the image processing on the image data according to the image processing condition at the time of the printing processing.

Furthermore, in the first and second printing order processing systems of the present invention, the control means may control the order reception server so that the order reception server can receive the thumbnail image data only in the case where reception of the thumbnail image data is permitted.

In the first and second printing order processing systems of the present invention, the control means may control the order reception server so as to notify the predetermined storage location of reception of the image data before and/or after reception of the image data.

Moreover, in the first printing order processing system of the present invention, the control means may permit reception of the image data during a predetermined communication time enabling communication with the predetermined storage location.

In the first printing order processing system of the present invention, the control means may carry out judgment as to how busy the network and/or the printing processing means are so that the control means can permit reception of the image data according to a result of the judgment.

The first and second printing order processing methods of the present invention may be provided as programs that cause a computer to execute the methods.

According to the present invention, the order reception server receives the image data from the predetermined storage location only in the case where the image data reception is permitted. Therefore, if the reception is permitted when the communication line is not congested, the time necessary for transferring the image data from the predetermined storage location can be shortened. Furthermore, if the reception is permitted when the printing processing means is not heavily loaded, the time necessary for the printing processing can also be shortened. Moreover, if a reception time is pre-assigned and thus predetermined, fluctuation in image-data transfer time can be prevented, and the image data reception and/or the printing processing can be carried out efficiently. In this case, since the image data are securely received in the reception time that is predetermined, the time of delivery can be estimated with accuracy regarding the printing order. In the case where the reception time is pre-assigned, a large-capacity server that can process a large amount of printing orders at once becomes unnecessary. Therefore, the system can be downsized and the cost therefor can also be reduced. As a result, a charge for the printing service can be lowered.

By causing the order reception server to receive only the order information prior to the image data reception, the fact can be recognized that the printing order regarding the image data has been placed by the predetermined storage location. Therefore, the image data reception can be prevented from being forgotten.

Furthermore, if the thumbnail image data are received in advance and checked by the order reception server before the image data reception, whether or not the image data can be printed can be judged before the actual reception. Therefore, by receiving only the image data corresponding to the thumbnail image data that have passed the check, image data that cannot be printed are never received. As a result, the time necessary for the image data reception can be shortened. Moreover, prevention of printing of image data that cannot be printed leads to prevention of an unlawful action such as illegal copying.

In the case where the order reception server receives the thumbnail image data prior to reception of the image data, if the image processing condition is calculated based on the thumbnail image data for carrying out the image processing on the image data, even a printing processing operator who is not familiar with the image processing can carry out the image processing appropriately on the image data according to the image processing condition. The image processing can also be carried out without involving an operator. Therefore, even in a time period such as midnight when no operator is at work, the printing processing can be carried out through the appropriate image processing on the image data.

If the thumbnail image data are received only in the case where the reception thereof is permitted, the thumbnail image data can be received at a high speed by permitting the reception at the time the communication line is not congested. If the thumbnail image data reception is permitted by assigning a reception time for the thumbnail image data in advance, the communication line can be prevented from being congested.

Moreover, by notifying the image data reception to the predetermined storage location before and/or after the actual image data reception, the predetermined storage location can recognize the fact that the image data are to be and/or have been received. Consequently, the predetermined storage location can recognize the fact that the printing processing regarding the image data is carried out in response to the reception of the image data.

By permitting the image data reception during the communication time that is agreed with the user in advance through a contract or the like, the image data of the user are received in priority in the communication time. Therefore, the printing processing associated with the user can be carried out promptly.

By permitting the image data reception by the order reception server according to a result of judgment on the state of printing processing means and/or the network, the order reception server can receive the image data when the communication line and/or the printing processing means are not heavily loaded, in response to the state of printing order processing. In this manner, the printing processing can be carried out efficiently.

Furthermore, by judging whether or not the image data reception is permitted based on the state of the printing processing means and by causing the order reception server to receive the image data only in the case where the image data reception is permitted, the order reception server can receive the image data in response to the state of the printing processing means. In this manner, efficient printing processing can be carried out.

DESCRIPTION OF THE PREFERRED EMBODIMENTS

Figure 1:
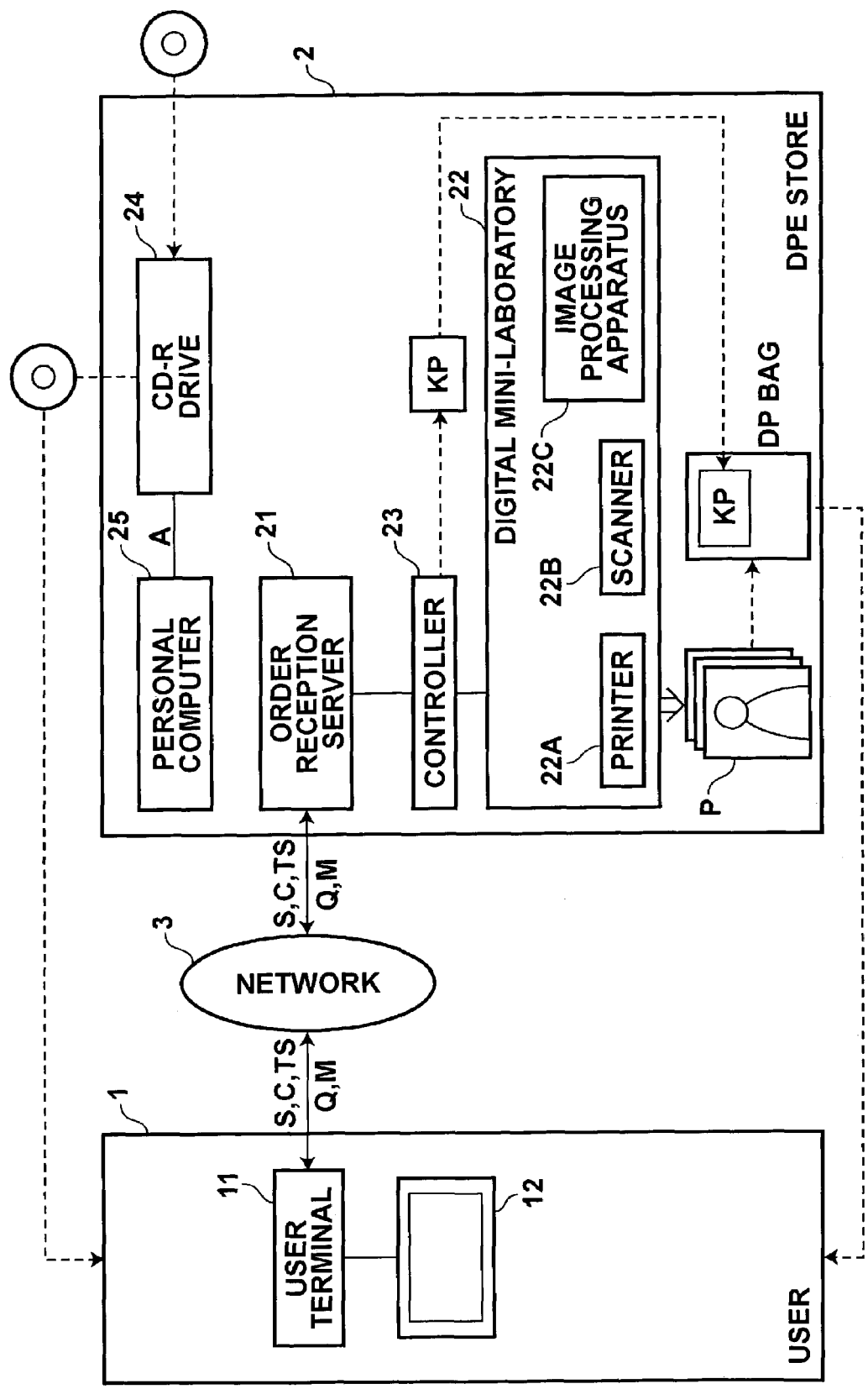
FIG. 1 is a block diagram showing a configuration of a printing service system comprising a printing order processing system of a first embodiment of the present invention.

Hereinafter, embodiments of the present invention will be explained with reference to the accompanying drawings. FIG. 1 is a block diagram showing a configuration of a printing service system adopting a printing order processing system of a first embodiment of the present invention. As shown in FIG. 1, the printing service system in the first embodiment exchanges data, prints, and the like between a user 1 and a DPE store 2. In FIG. 1, a solid line shows a flow of data while a broken line shows a flow of an object.

The user 1 has a personal computer that acts as a user terminal 11. The personal computer comprises a hard disc, a monitor 12, a keyboard, a mouse, a CD-ROM drive, and a PC card slot for reading image data from a recording medium for a digital camera (that is, a memory card such as Smart Media™ and Compact Flash™, for example). The user 1 can place a printing order to the DPE store 2 via a network 3 such as the Internet. In the case where the user 1 does not have a personal computer, the user 1 can use a terminal that is dedicated to ordering and installed in a service station or the like. The user 1 is supposed to firstly carry out transmission to an order reception server 21 of order information C representing the content of a printing order and a thumbnail image data set or thumbnail image data sets TS (hereinafter referred to as the thumbnail image data sets TS) of an image data set or image data sets S (hereinafter referred to as the image data sets S) used in printing.

The DPE store 2 comprises the order reception server 21 for receiving the printing order, a digital mini-laboratory 22 for obtaining a print or prints P (hereinafter referred to as the prints P) based on the image data sets S sent from the user terminal 11 via the network 3 at the time the printing order is placed, a controller 23 for controlling the order reception server 21 and the digital mini-laboratory 22, and a personal computer 25 connected to a CD-R drive 24 for recording information in a CD-R. The controller 23 corresponds to control means. The CD-R drive 24 may carry out recording in a recording medium other than a CD-R, such as a DVD-R.

The order reception server 21 has a function of storing the image data sets S and the order information C sent from the user terminal 11, as will be explained later. The order reception server 21 is always connected to the network 3.

The digital mini-laboratory 22 corresponds to printing processing means for generating the prints P by carrying out printing processing on the image data sets S. The digital mini-laboratory 22 comprises a printer 22A for obtaining the prints P based on the image data S, a scanner 22B for scanning a negative film, and an image processing apparatus 22C for carrying out image processing on the image data sets S. The digital mini-laboratory 22 also has a function of writing the image data sets S in a recording medium such as a CD-R. The thumbnail image data sets TS sent from the user terminal 11 are input to the image processing apparatus 22C. The image processing apparatus 22C calculates image processing conditions used in the image processing to be carried out on the image data sets S, such as gradation conversion processing, white balance processing, and sharpness processing, based on the thumbnail image data sets TS. The image processing conditions are temporarily stored in a memory that is not shown in FIG. 1, and the image processing is carried out on the image data S according to the image processing conditions when the prints P are generated.

The controller 23 comprises a computer and a printer, and controls and manages the order reception server 21 and the digital mini-laboratory 22. An operator at the DPE store 2 operates the controller 23. The controller 23 prints a label KP on which a printing charge, the name of the user 1, the content of printing, and an order reception ID corresponding to the order information C are printed. By pasting the label KP on a DP bag containing the prints P, the prints P are easily classified and the user 1 is easily invoiced.

The controller 23 judges how congested a communication line of the network 3 to the order reception server 21 is and/or how busy the digital mini-laboratory 22 is. The controller 23 sends a reception permit Q regarding the image data sets S to the user terminal 11 that sent the order information C, in the case where the image data sets S pertinent to the order information C can be received at a comparatively high speed and/or in the case where the printing processing can be started in a comparatively short time. After reception of the image data sets S (hereinafter referred to as the image data reception), the controller 23 sends to the user terminal 11 a message M notifying the user of the image data reception. The reception permit Q and the message M are sent according to a control of the order reception server 21. The reception permit Q and the message M may be displayed on the monitor 12 connected to the user terminal 11, as messages notifying permission and completion of the image data reception. Alternatively, the reception permit Q and the message M may be sent as audio messages, or as audio messages accompanied by display on the monitor 12. In the case where the image data sets S are sent from the user terminal 11 before transmission of the reception permit Q, that is, before the image data reception is permitted, information is sent to the user terminal 11 for displaying on the monitor 12 a message notifying the user of the fact that the image data sets S are not received at present.

The controller 23 checks whether or not the image data sets S can be printed, based on the thumbnail image data sets TS. For example, the controller 23 checks each of the image data sets S for data damage and for prohibition of printing due to copyright. The controller 23 controls the order reception server 21 so as to receive only each of the image data sets S whose thumbnail image data set TS has passed the check. The controller 23 inputs the thumbnail image data sets TS to the image processing apparatus 22C of the digital mini-laboratory 22.

The CD-R drive 24 is connected to the personal computer 25 and records access information A for accessing the order reception server 21 of the DPE store 2 in a CD-R that stores viewer software having functions of image display, generation and transmission of the order information C, and the like. The IP address or URL of the order reception server 21 is used as the access information A. The CD-R is provided to the user 1 at the time the DPE store 2 sells a digital camera to the user 1 or at the time the user 1 visits the DPE store 2, or on the street, for example.

The user 1 sets the CD-R in the CD-ROM drive (not shown) of the user terminal 11 and installs in the user terminal 11 the viewer software stored in the CD-R. At this time, the access information A recorded in the CD-R is input to the viewer software. In this manner, the user 1 can browse through and manipulate the image data sets S, generate the order information C and the thumbnail image data sets TS, and places the printing order (that is, transmission of the thumbnail image data sets TS, the image data sets S and the order information C), with use of the viewer software. Upon the transmission of the thumbnail image data sets TS, the image data sets S to be printed, and the order information C, the user terminal 11 is accessed by the order reception server 21 of the DPE store 2 that corresponds to the access information A, according to the viewer software.

Figure 2:
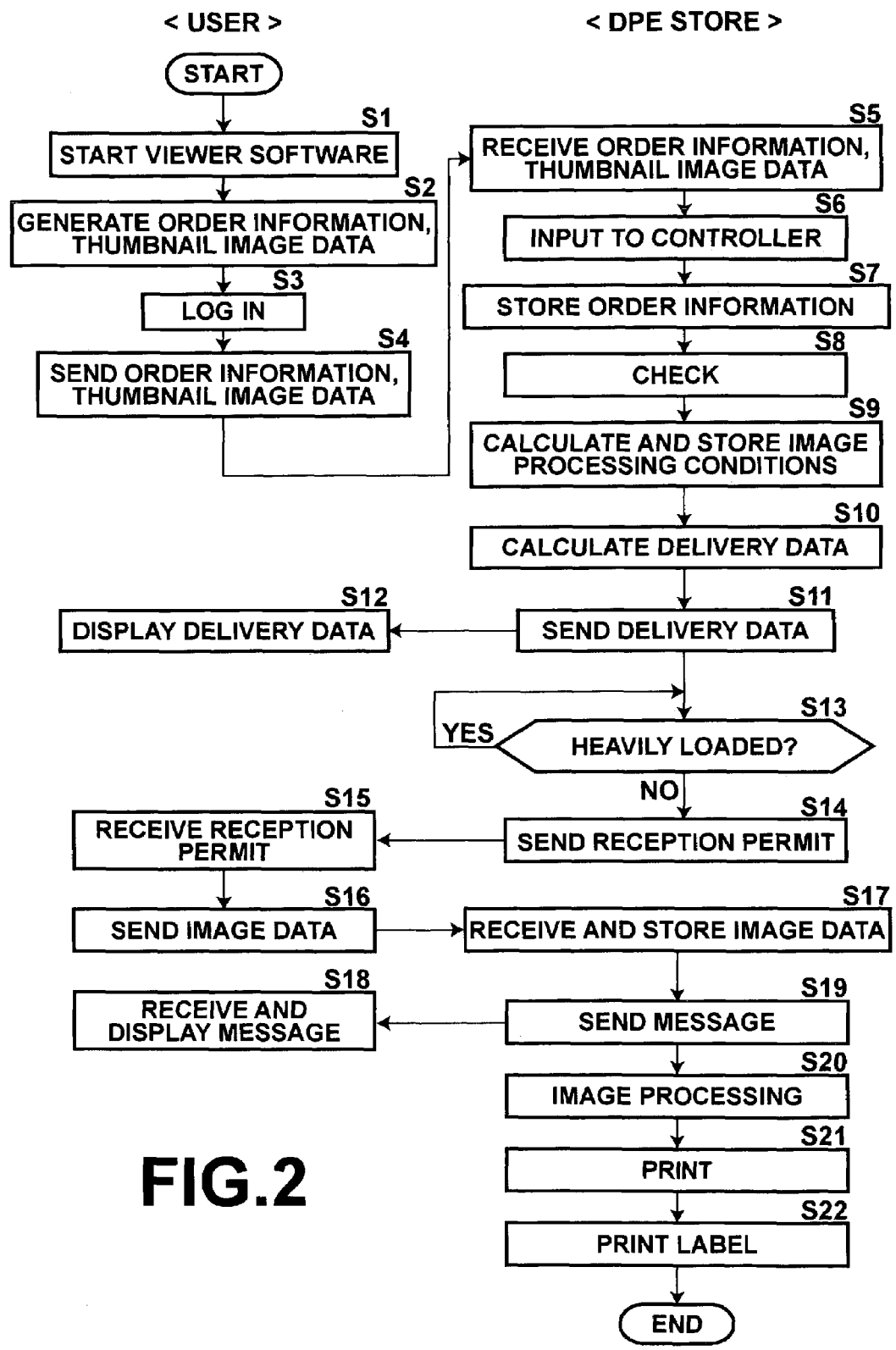
FIG. 2 is a flow chart showing procedures carried out in the first embodiment.

The operation of the first embodiment will be explained next. FIG. 2 is a flow chart showing procedures carried out in the first embodiment. The user 1 is assumed to have been provided with the CD-R storing the access information A of the DPE store 2, and the user terminal 11 has the viewer software installed therein from the CD-R. In this example, ordinary printing (that is, printing by the printer 22A of the digital mini-laboratory 22) is carried out regarding the image data sets S owned by the user 1. The user 1 has already received his/her user ID and password for accessing the order reception server 21.

The user 1 starts the viewer software (Step S1), and generates the order information C and the thumbnail image data sets TS (Step S2). The user 1 accesses the order reception server 21 of the DPE store 2, and logs in the order reception server 21 by using the user ID and the password (Step S3). After logging in, the user 1 sends the order information C and the thumbnail image data sets TS thereto (Step S4). The order reception server 21 receives the order information C and the thumbnail image data sets TS (Step S5), and inputs the order information C and the thumbnail image data sets TS to the controller 23 (Step S6). The controller 23 stores the order information C (Step S7). Whether the respective image data sets S whose printing is ordered by the user 1 can be printed is then judged, based on the thumbnail image data sets TS (Step S8). A result of the judgment is stored in the controller 23. The thumbnail image data sets TS are input to the image processing apparatus 22C of the digital mini-laboratory 22 wherein the image processing conditions for the image processing on the image data sets S are calculated based on the thumbnail image data sets and stored (Step S9).

The controller 23 generates deadline information comprising a rough date/time of the image data reception and a rough deadline of printing (Step S10), based on the content of the printing order represented by the order information C and a state of the digital mini-laboratory 22 (that is, printing performance of the digital mini-laboratory 22, how broad the communication line is, and how busy the digital mini-laboratory 22 is). The controller 23 then sends the deadline information to the user terminal 11 (Step S11). The deadline information is displayed on the user terminal 11 (Step S12). In the case where the order reception server 21 downloads the image data sets S by accessing the user terminal 11, the deadline information includes a rough date/time of the downloading.

Thereafter, the controller 23 judges how busy the communication line for accessing the order reception server 21 is and/or how busy the digital mini-laboratory 22 is for printing. In this manner, a judgment is made as to whether or not the communication line and/or the digital mini-laboratory 22 are heavily loaded (Step S13). This judgment is carried out until a result at Step S13 becomes negative. The judgment at Step S13 can be carried out in parallel with the procedures from Step S6 to Step S12. When the result at Step S13 becomes negative, the reception permit Q is sent to the user terminal 11 for permitting the image data reception (Step S14). The user terminal 11 receives the reception permit Q (Step S15), and sends the image data sets S to the order reception server 21 (Step S16). The reception permit Q may be displayed on the monitor 12 so that the user 1 can manually send the image data sets S to the order reception server 21 after noticing the reception permit Q.

At this time, the order reception server 21 has already recognize which of users including the user 1 will send which of image data sets including the image data sets S, based on order information including the order information C that has been received. Therefore, the user 1 is not authenticated. In the case where the order reception server 21 downloads the image data sets S by accessing the user terminal 11, the rough date/time of downloading has been notified by the deadline information sent to the user terminal 11. Therefore, the user terminal 11 does not need to authenticate the order reception server 21. However, in order to improve security, the user terminal 11 may authenticate the order reception server 21.

The order reception server 21 receives and stores the image data sets S (Step S7). The controller 23 controls the order reception server 21 so as to prevent reception of any portion of the image data sets S that has not passed the check. The message M is sent to the user terminal 11 (Step S18) after the image data reception. The user terminal 11 receives the message M for display on the monitor 12 (Step S19). In this manner, the user 1 can recognize the fact that the image data sets S have been received and printing is going to be carried out. The message M may include the file name or names of the portion of the image data sets S that failed to pass the check. In this manner, the user 1 can realize which of the image data sets S is not going to be printed, before actually receiving the prints P.

The controller 23 regularly checks whether or not the order reception server 21 has received the image data sets S. In the case where the digital mini-laboratory 22 is not heavily loaded with printing processing, the controller 23 checks the image data reception more frequently. In the case where the image data set S have been received, the image data sets S are input to the digital mini-laboratory 22. The image processing apparatus 22C then carries out the image processing on the image data sets S (Step S20) according to the image processing conditions that have been calculated based on the thumbnail image data sets TS. The printer 22A then outputs the prints P based on the order information C (Step S21). At this time, the order reception ID is printed on the backside of each of the prints P. Prints including the prints P of the user 1 are sorted in order of reception of the order information including the order information C of the user 1.

The name of the user 1, the content of printing, the printing charge, the order reception ID, and the like are printed on the label KP (Step S22) according to the order information C, and the printing processing is completed. The operator in the DPE store 2 attaches the label KP on the DP bag to contain the prints P, and puts the prints P corresponding to the order reception ID in the DP bag. The user 1 visits the DPE store 2 after the time of printing completion, and receives the prints P by paying the charge. The prints P may be provided to the user 1 by delivery or mail.

As has been described above, in this embodiment, the image data sets S are received after reception of the image data sets S is permitted by the reception permit Q sent to the user terminal 11. Therefore, if the image data reception is permitted when the communication line is not congested, the time necessary for sending the image data sets S from the user terminal 11 can be shortened. Furthermore, if the image data reception is permitted when the digital mini-laboratory 22 is not heavily loaded, the time necessary for the printing processing can also be shortened. Since the image data reception is not permitted in a busy situation, a large-capacity server for processing a large amount of printing orders at once becomes unnecessary. Therefore, the system can be downsized and the cost therefor can be lowered, which leads to provision of lower-cost printing services.

By receiving the order information C by using the order reception server 21 in advance, the fact can be recognized in advance that the user terminal 11 has the image data sets S to be printed. In this manner, the image data reception can be prevented from being forgotten.

By receiving and by checking the thumbnail image data sets TS in advance, whether the respective image data sets S can be printed is judged in advance. Therefore, by receiving only the image data sets S whose thumbnail image data sets TS have passed the check, none of the image data sets S that cannot be printed are received. As a result, the time necessary for receiving the image data sets S can be shortened. Furthermore, printing of the image data sets S that cannot be printed is prevented, which leads to prevention of an unlawful action such as unauthorized copying.

By calculating the image processing conditions to be used for the image processing on the image data sets S based on the thumbnail image data sets TS and by carrying out the image processing on the image data sets S according to the image processing conditions, the image processing can be carried out appropriately even by a printing processing operator who is not familiar with the image processing. Furthermore, since the image processing can be carried out in an unmanned situation, the printing processing can be carried out through the appropriate image processing on the image data sets S even in a time period, such as midnight, when no operator is available.

By allowing the order reception server 21 of the DPE store 2 to permit the image data reception, the order reception server 21 can receive the image data sets S according to an amount of printing orders, that is, according to how busy the communication line and/or the digital mini-laboratory 22 are. In this manner, the printing processing can be carried out efficiently.

In the first embodiment, the order reception server 21 receives the order information C and the thumbnail image data sets TS in advance. However, only the order information C may be received in advance so that the thumbnail image data sets TS are received after a reception permit regarding the thumbnail image data sets TS is issued according to the judgment of the state of the communication line. Hereinafter, this method will be explained as a second embodiment of the present invention.

Figure 3:
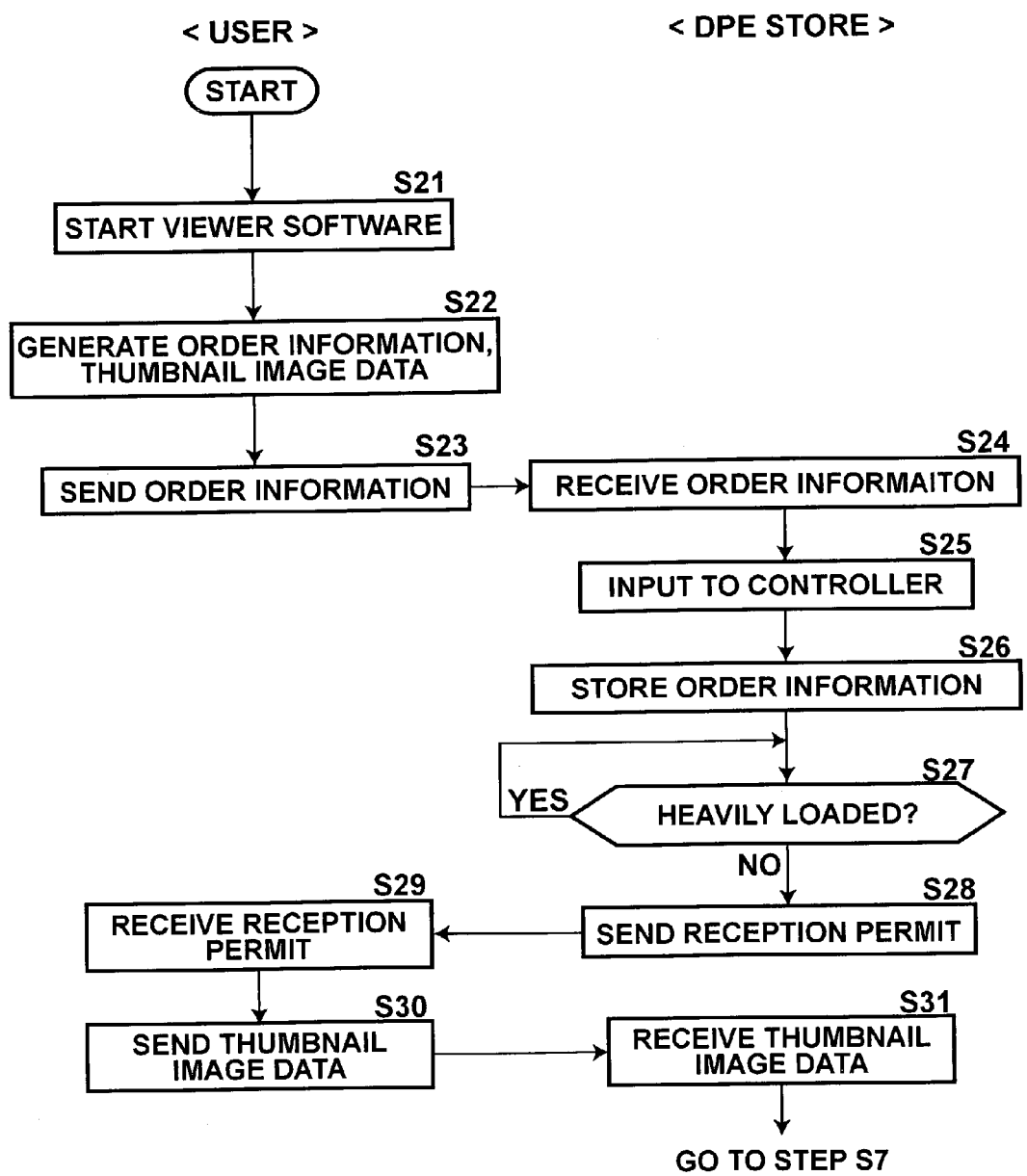
FIG. 3 is a flow chart showing procedures carried out in a second embodiment of the present invention.

FIG. 3 is a flow chart showing procedures carried out in the second embodiment. A user 1 starts viewer software (Step S31), and generates order information C and thumbnail image data sets TS (Step S32). The user 1 accesses an order reception server 21 of a DPE store 2 and sends the order information C thereto (Step S33). The order reception server 21 of the DPE store 2 receives the order information C (Step S34), and inputs the order information to a controller 23 (Step S35) The controller 23 stores the order information C (Step S36).

The controller 23 checks a state of a communication line for accessing the order reception server 21 and judges whether or not the communication line is heavily loaded (Step S37). This judgment is made until a result at Step S37 becomes negative. The judgment at Step S37 may be carried out in parallel to the procedures from Step S34 to Step S36. When the result at Step S37 becomes negative, a reception permit regarding the thumbnail image data sets TS is sent to a user terminal 11 (Step S38). The user terminal 11 receives the reception permit (Step S39), and sends the thumbnail image data sets TS to the order reception server 21 (Step S40). The reception permit may be displayed on a monitor 12 so that the user 1 can manually send the thumbnail image data sets TS to the order reception server 21 after noticing the reception permit.

The order reception server 21 receives the thumbnail image data sets TS (Step S41), and checks the thumbnail image data sets TS. Thereafter, the procedures from Step S8 in the first embodiment are carried out, and detailed explanations thereof are omitted.

In the second embodiment, a reception time regarding the thumbnail image data sets TS may be set in advance according to a contract so that the thumbnail image data sets TS can be sent after the reception permit is received.

In the first and second embodiments described above, the reception permit Q is sent to the user terminal 11 according to the state of the communication line and/or the digital mini-laboratory 22. However, the reception permit Q may be sent to the user terminal 11 at a reception time that is agreed with the user 1 in advance or upon the transmission of the order information C and the thumbnail image data sets TS. In this case, if the image data sets S are received by assigning the reception time for each of the users, fluctuation in image-data reception time can be prevented. In this manner, the image data sets S are received and/or printed efficiently. In addition, since the image data sets S are received with certainty in the reception time set in advance, the time of delivery of the prints P can be estimated with accuracy. Moreover, since the image data sets S of the user 1 who agreed with the reception time are received in priority in his/her reception time, the printing processing can be carried out promptly for the user 1 who agreed with the reception time.

In the case where the reception time is set in advance, the reception permit Q is not necessarily sent to the user terminal 11. In this case, the user terminal 11 sends the image data sets S in the reception time, and the order reception server 21 receives the image data sets S.

In the first and second embodiments of the present invention, the user terminal 11 sends the image data sets S to the order reception server 21. However, the order reception server 21 may access the user terminal 11 at the reception time so that the order reception server 21 can download the image data sets S. In the second embodiment, the order reception server 21 may access the user terminal 11 and download the thumbnail image data sets TS. In this case, it is preferable for the order reception server 21 to send to the user terminal 11 a message notifying reception and/or completion of reception of the image data sets S or the thumbnail image data sets TS before and/or after the order reception server 21 downloads the image data sets S or the thumbnail image data sets TS. In this manner, the user 1 can recognize the fact that the image data sets S or the thumbnail image data sets TS are going to be received and/or have been received. Consequently, the user 1 can recognize that the image data sets S are received for printing or that the thumbnail image data sets TS are received for the check.

In the first and second embodiments described above, the image data sets S to be printed are checked based on the thumbnail image data sets TS. However, this check is not necessarily carried out and the image data sets S are checked for printing after the image data reception.

In the first and second embodiments described above, the image processing conditions are calculated for the image processing on the image data sets S, based on the thumbnail image data sets TS. However, the image processing conditions may be calculated based on the image data sets S.

The thumbnail image data sets TS are received in the first and second embodiments, which is not necessarily carried out.

All the order information C, the image data sets S and/or the thumbnail image data sets TS may be sent from the user terminal 11 to the order reception server 21 after the order reception server 21 sends the reception permit to the user terminal 11 when the communication line and/or the digital mini-laboratory 22 are not heavily loaded. Alternatively, the order reception server 21 may send a reception permit regarding all the order information C, the image data sets S and/or the thumbnail image data sets TS to the user terminal 11 at the reception time agreed in advance. In addition, the order reception server 21 may download all the order information C and the image data sets S and/or the thumbnail image data sets TS by accessing the user terminal 11.

Figure 4:
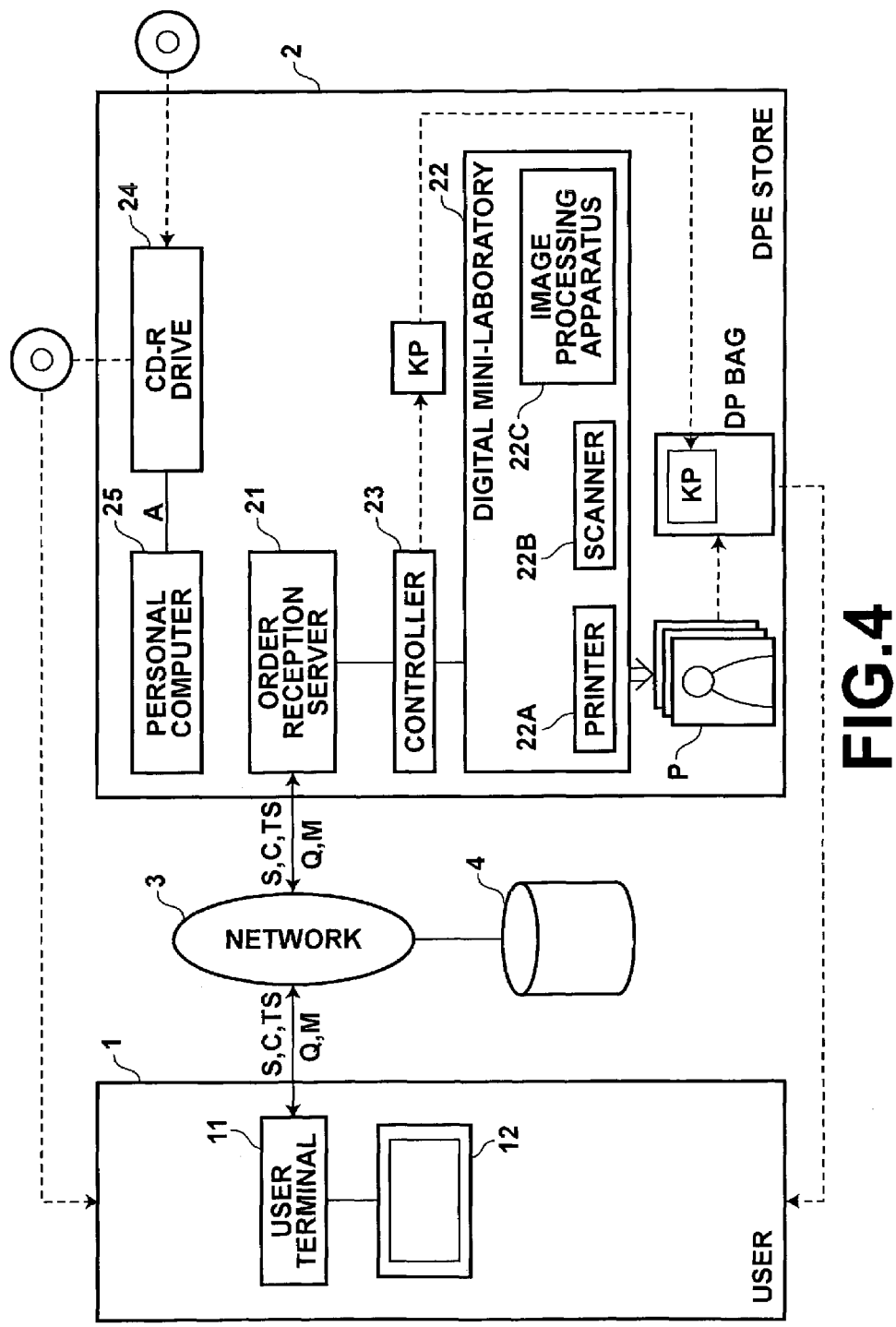
FIG. 4 is a block diagram showing a configuration of a printing service system comprising a printing order processing system of another embodiment of the present invention.

In the first and second embodiments described above, the order reception server 21 receives the image data sets S stored in the user terminal 11. However, as shown in FIG. 4, an image server 4 for storing image data sets S sent from a user terminal 11 may be installed so that the image data sets S are received from the image server 4. In this case, a DPE store 2 is notified of the location of the image data sets S (the IP address or URL of the image server 4, for example), and the image data sets S are received by an access to the image server 4 at a time when the reception is possible.

In the first and second embodiments described above, the user terminal 11 may choose between transfer of the image data sets S only in the case where reception thereof is permitted by the order reception server 21 according to the procedures in the present invention and forcible transfer of the image data sets S to the order reception server 21. The choice can be made by the viewer software installed in the user terminal 11. In this manner, the user 1 can forcibly send the image data sets S to the order reception server 21 in an urgent case, otherwise can send the image data sets S according to the procedures in the present invention. As a result, the image data sets S can be sent according to a state of the user 1.

A skilled artisan would know that computer readable media are not limited to any specific type of storage device and include any kind of device, including but not limited to CDs, floppy discs, RAMs, ROMs, hard discs, magnetic tapes, and internet downloads, in which computer instructions can be stored and/or transmitted. Transmission of the computer code through a network or through wireless transmission means is also within the scope of this invention. Additionally, computer code/instructions include, but are not limited to, source, object, and executable code and can be in any language including higher level languages, assembly language and machine language.

What is claimed is:

1. A printing order processing method for carrying out printing processing on image data with use of printing processing means according to order information representing the content of a printing order regarding the image data, by using an order reception server for receiving the image data and the order information that are stored in a predetermined storage location and transferred via a network, the printing order processing method comprising the step of:
receiving the image data from the predetermined storage location by using the order reception server only in the case where reception of the image data is permitted.

2. A printing order processing method as defined in claim 1, further comprising the step of receiving the order information in advance by using the order reception server.

3. A printing order processing method as defined in claim 1, further comprising the step of sending a reception notification to the predetermined storage location before and/or after the image data are received.

4. A printing order processing method as defined in claim 1, wherein the reception of the image data is permitted during a predetermined communication time enabling communication with the predetermined storage location.

5. A printing order processing method as defined in claim 1, further comprising the steps of;
carrying out judgment as to how busy the network and/or the printing processing means are; and
permitting the reception of the image data based on a result of the judgment.

6. A printing order processing method as defined in claim 1, further comprising the step of:
receiving thumbnail image data representing a thumbnail image of an image represented by the image data in advance by using the order reception server;
calculating an image processing condition to be used in image processing on the image data, based on the thumbnail image data; and
carrying out the image processing on the image data according to the image processing condition at the time the printing processing is carried out.

7. A printing order processing method as defined in claim 6, wherein the step of receiving the thumbnail image data is the step of receiving the thumbnail image data only in the case where reception of the thumbnail image data is permitted.

8. A printing order processing method as defined in claim 1, further comprising the steps of:
receiving thumbnail image data representing a thumbnail image of an image represented by the image data in advance by using the order reception server; and
carrying out a check on the thumbnail image data; wherein the step of receiving the image data is the step of receiving only the image data corresponding to the thumbnail image data that have passed the check.

9. A printing order processing method as defined in claim 8, wherein the step of receiving the thumbnail image data is the step of receiving the thumbnail image data only in the case where reception of the thumbnail image data is permitted.

10. A printing order processing method as defined in claim 8, wherein the carrying out a check on the thumbnail image data determines that the image data is not damaged.

11. A printing order processing method as defined in claim 10, wherein the carrying out a check on the thumbnail image data further determines that the image data is not copyright protected.

12. A printing order processing method as defined in claim 1, wherein the reception of image data is permitted based on at least one of network traffic, copyright protection, and image data damage.

13. A printing order processing method as defined in claim 12, wherein the reception of image data is permitted based further on whether the image data may be received at a comparatively high data transfer rate.

14. A printing order processing method as defined in claim 1, wherein the order information comprises at least one of an image number representing an image data file, a print size, a quantity of prints, a specification of printing paper, a thickness of the printing paper, and a trimming of the print.

15. A printing order processing method as defined in claim 14, wherein the order information further comprises a user name, address, zip code and phone number.

16. A printing order processing method as defined in claim 14, wherein the printing processing on image data according to the order information is performed at the order receiving server.

17. A printing order processing method for carrying out printing processing on image data with use of printing processing means according to order information representing the content of a printing order regarding the image data, by using an order reception server for receiving the image data and the order information that are stored in a predetermined storage location and transferred via a network, the printing order processing method comprising the steps of:

judging whether or not reception of the image data is permitted, based on a state of the printing processing means; and receiving the image data from the predetermined storage location by using the order reception server only in the case where the reception of the image data is permitted.

18. A printing order processing method as defined in claim 17, further comprising the step of receiving the order information in advance by using the order reception server.

19. A printing order processing method as defined in claim 17, further comprising the step of sending a reception notification to the predetermined storage location before and/or after the image data are received.

20. A printing order processing method as defined in claim 17, further comprising the step of:

receiving thumbnail image data representing a thumbnail image of an image represented by the image data in advance by using the order reception server;

calculating an image processing condition to be used in image processing on the image data, based on the thumbnail image data; and carrying out the image processing on the image data according to the image processing condition at the time the printing processing is carried out.

21. A printing order processing method as defined in claim 20, wherein the step of receiving the thumbnail image data is the step of receiving the thumbnail image data only in the case where reception of the thumbnail image data is permitted.

22. A printing order processing method as defined in claim 17, further comprising the steps of:

receiving thumbnail image data representing a thumbnail image of an image represented by the image data in advance by using the order reception server; and carrying out a check on the thumbnail image data; wherein the step of receiving the image data is the step of receiving only the image data corresponding to the thumbnail image data that have passed the check.

23. A printing order processing method as defined in claim 22, wherein the step of receiving the thumbnail image data is the step of receiving the thumbnail image data only in the case where reception of the thumbnail image data is permitted.

24. A printing order processing method as defined in claim 22, wherein the carrying out a check on the thumbnail image data determines that the image data is not damaged.

25. A printing order processing method as defined in claim 24, wherein the carrying out a check on the thumbnail image data further determines that the image data is not copyright protected.

26. A printing order processing system comprising an order reception server for receiving image data and order information that are stored in a predetermined storage location and sent via a network, and printing processing means for carrying out printing processing on the image data according to the order information representing the content of a printing order regarding the image data, the printing order processing system further comprising:

control means for controlling the order reception server so that the order reception server receives the image data from the predetermined storage location only in the case where reception of the image data is permitted.

27. A printing order processing system as defined in claim 26, wherein the control means controls the order reception server so that the order reception server receives only the order information in advance.

28. A printing order processing system as defined in claim 26 wherein the control means controls the order reception server so as to notify the predetermined storage location of the reception of the image data before and/or after the reception of the image data.

29. A printing order processing system as defined in claim 26 wherein the control means permits the reception of the image data during a predetermined communication time enabling communication with the predetermined storage location.

30. A printing order processing system as defined in claim 26 wherein the control means carries out judgment as to how busy the network and/or the printing processing means are, and permits the reception of the image data according to a result of the judgment.

31. A printing order processing system as defined in claim 26, the order reception server receiving thumbnail image data representing a thumbnail image of an image represented by the image data in advance, and the printing order processing system further comprising:

image processing means for calculating, based on the thumbnail image data, an image processing condition used in image processing to be carried out on the image data and for carrying out the image processing on the image data according to the image processing condition at the time of the printing processing.

32. A printing order processing system as defined in claim 31 wherein the control means controls the order reception server so that the order reception server receives the thumbnail image data only in the case where reception of the thumbnail image data is permitted.

33. A printing order processing system as defined in claim 26, wherein the order reception server receives thumbnail image data representing a thumbnail image of an image represented by the image data in advance, and the control means carries out a check on the thumbnail image data and controls the order reception server so that the order reception server receives only the image data corresponding to the thumbnail image data that have passed the check.

34. A printing order processing system as defined in claim 33 wherein the control means controls the order reception server so that the order reception server receives the thumbnail image data only in the case where reception of the thumbnail image data is permitted.

35. A printing order processing system as defined in claim 33, wherein the carrying out a check on the thumbnail image data determines that the image data is not damaged.

36. A printing order processing method as defined in claim 35, wherein the carrying out a check on the thumbnail image data further determines that the image data is not copyright protected.

37. A printing order processing system comprising an order reception server for receiving image data and order information that are stored in a predetermined storage location and sent via a network, and printing processing means for carrying out printing processing on the image data according to the order information representing the content of a printing order regarding the image data, the printing order processing system further comprising:

judgment means for judging whether or not reception of the image data is permitted, based on a state of the printing processing means; and control means for controlling the order reception server so that the order reception server receives the image data from the predetermined storage location only in the case where the reception of the image data is permitted.

38. A printing order processing system as defined in claim 37, wherein the control means controls the order reception server so that the order reception server receives only the order information in advance.

39. A printing order processing system as defined in claim 37 wherein the control means controls the order reception server so as to notify the predetermined storage location of the reception of the image data before and/or after the reception of the image data.

40. A printing order processing system as defined in claim 37, the order reception server receiving thumbnail image data representing a thumbnail image of an image represented by the image data in advance, and the printing order processing system further comprising:
image processing means for calculating, based on the thumbnail image data, an image processing condition used in image processing to be carried out on the image data and
for carrying out the image processing on the image data according to the image processing condition at the time of the printing processing.

41. A printing order processing system as defined in claim 40 wherein the control means controls the order reception server so that the order reception server receives the thumbnail image data only in the case where reception of the thumbnail image data is permitted.

42. A printing order processing system as defined in claim 37, wherein
the order reception server receives thumbnail image data representing a thumbnail image of an image represented by the image data in advance, and
the control means carries out a check on the thumbnail image data and controls the order reception server so that the order reception server receives only the image data corresponding to the thumbnail image data that have passed the check.

43. A printing order processing system as defined in claim 42 wherein the control means controls the order reception server so that the order reception server receives the thumbnail image data only in the case where reception of the thumbnail image data is permitted.

44. A printing order processing system as defined in claim 42, wherein the carrying out a check on the thumbnail image data determines that the image data is not damaged.

45. A printing order processing method as defined in claim 44, wherein the carrying out a check on the thumbnail image data further determines that the image data is not copyright protected.

46. A program embodied on a computer-readable medium that causes a computer to execute a printing order processing method for carrying out printing processing on image data with use of printing processing means according to order information representing the content of a printing order regarding the image data, by using an order reception server for receiving the image data and the order information that are stored in a predetermined storage location and transferred via a network, the program comprising the step of:
receiving the image data from the predetermined storage location by using the order reception server only in the case where reception of the image data is permitted.

47. A program embodied on a computer-readable medium as defined in claim 46, said program further comprising the step of receiving the order information in advance by using the order reception server.

48. A program embodied on a computer-readable medium as defined in claim 46, said program further comprising the step of sending a reception notification to the predetermined storage location before and/or after the image data are received.

49. A program embodied on a computer-readable medium as defined in claim 46, wherein the reception of the image data is permitted during a predetermined communication time enabling communication with the predetermined storage location.

50. A program embodied on a computer-readable medium as defined in claim 46, said program further comprising the steps of:
carrying out judgment as to how busy the network and/or the printing processing means are; and
permitting the reception of the image data, based on a result of the judgment.

51. A program embodied on a computer-readable medium as defined in claim 46, the program further comprising the steps of:
receiving thumbnail image data representing a thumbnail image of an image represented by the image data in advance by using the order reception server;
calculating an image processing condition to be used in image processing on the image data, based on the thumbnail image data; and
carrying out the image processing on the image data according to the image processing condition at the time the printing processing is carried out.

52. A program embodied on a computer-readable medium as defined in claim 51, wherein the step of receiving the thumbnail image data is the step of receiving the thumbnail image data only in the case where reception of the thumbnail image data is permitted.

53. A program embodied on a computer-readable medium as defined in claim 46, the program further comprising the steps of:
receiving thumbnail image data representing a thumbnail image of an image represented by the image data in advance by using the order reception server; and
carrying out a check on the thumbnail image data; wherein
the step of receiving the image data is the step of receiving only the image data corresponding to the thumbnail image data that have passed the check.

54. A program embodied on a computer-readable medium as defined in claim 53, wherein the step of receiving the thumbnail image data is the step of receiving the thumbnail image data only in the case where reception of the thumbnail image data is permitted.

55. A program as defined in claim 53, wherein the carrying out a check on the thumbnail image data determines that the image data is not damaged.

56. A printing order processing method as defined in claim 55, wherein the carrying out a check on the thumbnail image data further determines that the image data is not copyright protected.

57. A program embodied on a computer-readable medium that causes a computer to execute a printing order processing method for carrying out printing processing on image data with use of printing processing means according to order information representing the content of a printing order regarding the image data, by using an order reception server for receiving the image data and the order information that are stored in a predetermined storage location and transferred via a network, the program comprising the steps of:

judging whether or not reception of the image data is permitted, based on a state of the printing processing means; and receiving the image data from the predetermined storage location by using the order reception server only in the case where the reception of the image data is permitted.

58. A program embodied on a computer-readable medium as defined in claim 57, said program further comprising the step of receiving the order information in advance by using the order reception server.

59. A program embodied on a computer-readable medium as defined in claim 57, said program further comprising the step of sending a reception notification to the predetermined storage location before and/or after the image data are received.

60. A program embodied on a computer-readable medium as defined in claim 57, said program further comprising the step of:

receiving thumbnail image data representing a thumbnail image of an image represented by the image data in advance by using the order reception server;

calculating an image processing condition to be used in image processing on the image data, based on the thumbnail image data; and carrying out the image processing on the image data according to the image processing condition at the time the printing processing is carried out.

61. A program embodied on a computer-readable medium as defined in claim 60, wherein the step of receiving the thumbnail image data is the step of receiving the thumbnail image data only in the case where reception of the thumbnail image data is permitted.

62. A program embodied on a computer-readable medium as defined in claim 57, said program further comprising the steps of:

receiving thumbnail image data representing a thumbnail image of an image represented by the image data in advance by using the order reception server; and carrying out a check on the thumbnail image data; wherein the step of receiving the image data is the step of receiving only the image data corresponding to the thumbnail image data that have passed the check.

63. A program embodied on a computer-readable medium as defined in claim 62, wherein the step of receiving the thumbnail image data is the step of receiving the thumbnail image data only in the case where reception of the thumbnail image data is permitted.

64. A program as defined in claim 62, wherein the carrying out a check on the thumbnail image data determines that the image data is not damaged.

65. A printing order processing method as defined in claim 64, wherein the carrying out a check on the thumbnail image data further determines that the image data is not copyright protected.

* * * * *